(12) United States Patent
Cleveland

(10) Patent No.: US 7,097,320 B2
(45) Date of Patent: Aug. 29, 2006

(54) ADD-ON ILLUMINATION DEVICE FOR MAGNIFIERS

(76) Inventor: Gregg William Cleveland, 1572 Cloverdale Ave., Upland, CA (US) 91786

( * ) Notice: Subject to any disclaimer, the term of this patent is extended or adjusted under 35 U.S.C. 154(b) by 93 days.

(21) Appl. No.: 10/958,025

(22) Filed: Oct. 4, 2004

(65) Prior Publication Data

US 2006/0072305 A1    Apr. 6, 2006

(51) Int. Cl.
*F21V 33/00* (2006.01)

(52) U.S. Cl. .............. 362/190; 362/191; 362/253; 362/187; 362/109

(58) Field of Classification Search ......... 362/253, 362/138, 187, 190, 191, 200, 201, 208, 234, 362/109
See application file for complete search history.

(56) References Cited

U.S. PATENT DOCUMENTS

| | | | | |
|---|---|---|---|---|
| 2,994,971 A | * | 8/1961 | Meisenheimer et al. | .... 434/289 |
| 4,454,669 A | * | 6/1984 | Simmons | ...... 40/361 |
| 5,113,327 A | * | 5/1992 | Levy | ........ 362/157 |
| 5,165,779 A | * | 11/1992 | Tortola et al. | ....... 362/109 |
| 5,937,681 A | * | 8/1999 | Myhr et al. | ....... 70/456 R |
| 6,435,692 B1 | * | 8/2002 | Naghi et al. | ........ 362/109 |
| 6,533,431 B1 | * | 3/2003 | Leifer et al. | ........ 362/109 |
| 6,857,756 B1 | * | 2/2005 | Reiff et al. | ........ 362/184 |

* cited by examiner

Primary Examiner—Thomas M. Sember

(57) ABSTRACT

The add-on illumination device provides a means of consistent, bright illumination to the viewing area of a collapsible (or folding) magnifier. This invention is easily inserted into the magnifier's lens storage compartment. Its lamps are situated under the edge of the magnifier's lens and are aimed at the magnifier's viewing area. The add-on illumination device dramatically improves the visibility of anything being viewed under the magnifier.

6 Claims, 4 Drawing Sheets

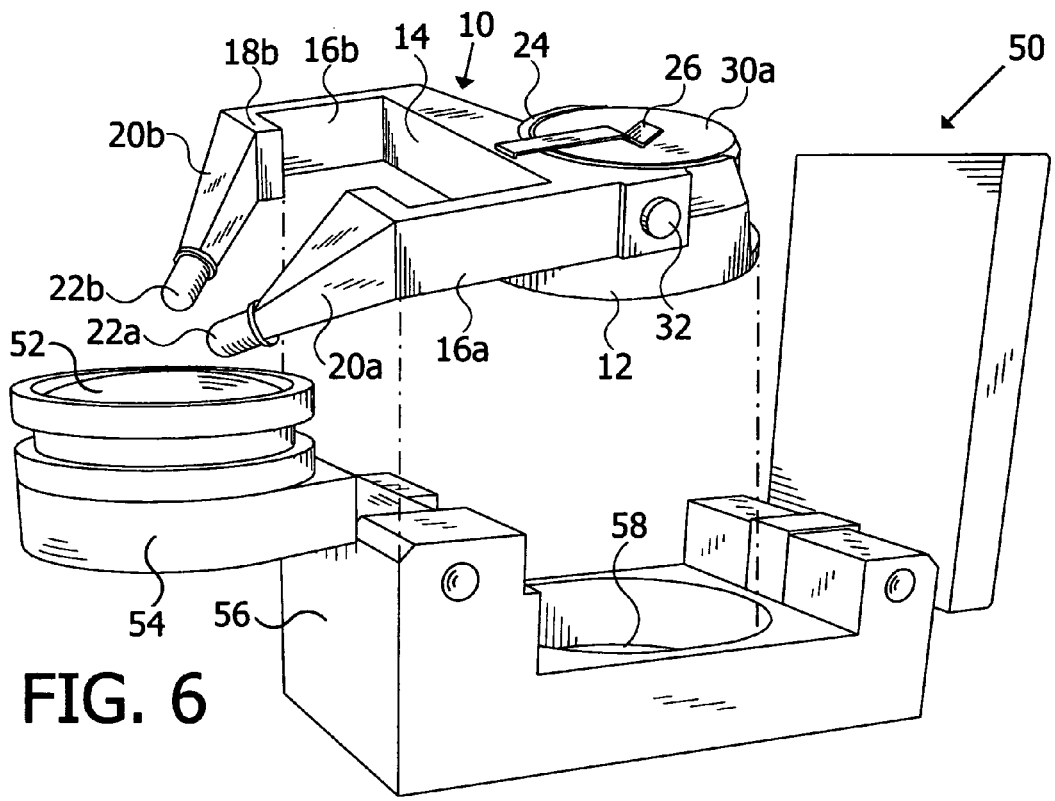
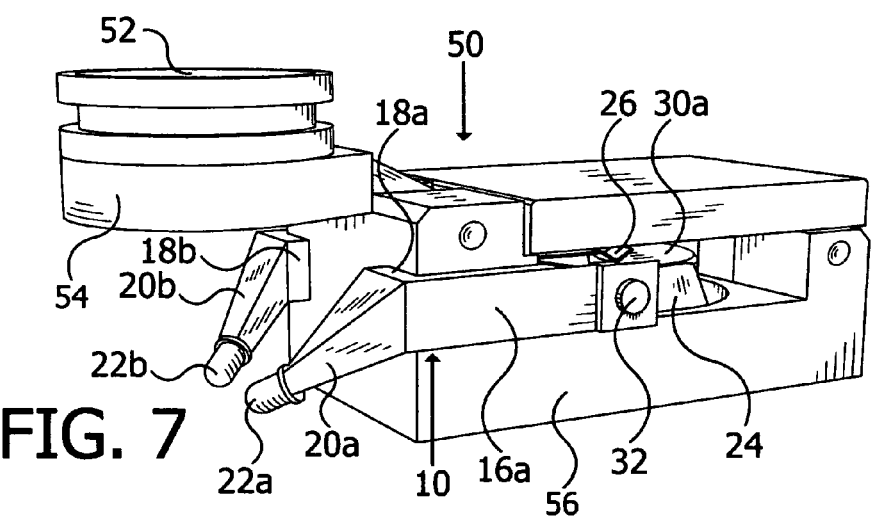

ADD-ON ILLUMINATION DEVICE FOR MAGNIFIERS

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

This invention relates generally to illuminating devices, specifically to an add-on illumination device for existing collapsible magnifiers.

Many common handheld collapsible magnifiers (also called loupes) such as those used in the printing industry, or by jewelers, do not have their own source of illumination. This results in a user being unable to clearly see magnified detail when necessary. These magnifiers have a long-standing need of a source of illumination that would provide consistent, bright light in close proximity to the object or image being viewed. An add-on illumination device attached to the magnifier would solve that need. Such a device has not previously existed.

SUMMARY OF THE INVENTION

The add-on illumination device provides a means of consistent, bright illumination to the viewing area of a collapsible (or folding) magnifier. Many common collapsible magnifiers have three parts: A hinged lens support frame, a hinged lid, and a body with a hollow storage compartment. The hollow storage compartment is used to store the lens and its supporting frame when the magnifier is in the collapsed position. The lens storage compartment is put to better use by holding the add-on illumination device. The illumination device is easily inserted into the magnifier's lens storage compartment. The illumination device's illumination sources are situated under the edge of the magnifier's lens. The illumination sources are aimed at the object or image under the lens. The add-on illumination device dramatically improves the visibility of anything being viewed under the magnifier.

BRIEF DESCRIPTION OF DRAWINGS

FIG. 6 is a side view of the illumination device being installed into a collapsible magnifier that has its lid opened.

FIG. 7 is a view of the illumination device installed into a collapsible magnifier.

Figure 1A:
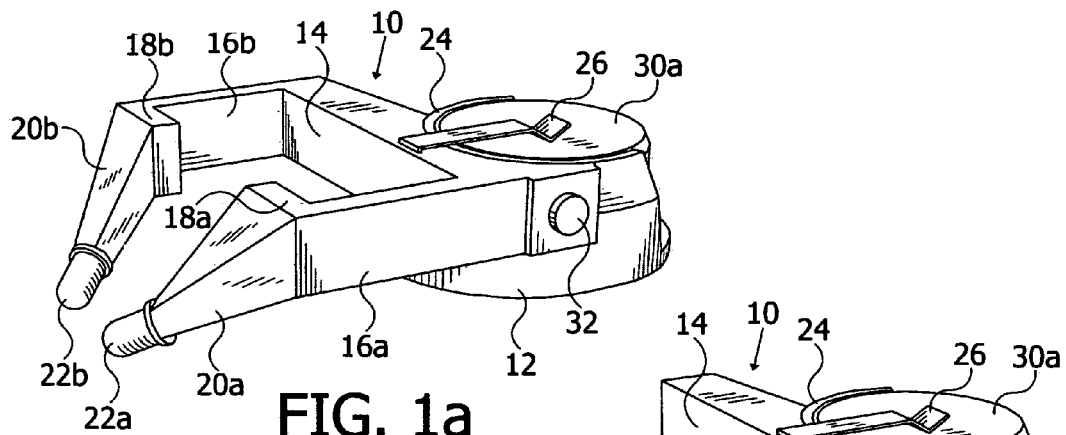
FIG. 1a is a perspective view of the preferred embodiment of the add-on illumination device for magnifiers.

DRAWINGS—REFERENCE NUMERALS 10 invention: add-on illumination device
12 base
14 central enclosure or housing
16a left side extension
16b right side extension
18a left front extension
18b right front extension
20a left lamp holder
20b right lamp holder
22a left illumination source
22b right illumination source
24 battery holder
26 upper battery contact
28 lower battery contact
30a battery
30b battery
30c battery
32 switch
34 resistor
36 wire
38 wire
40 wire
42 wire
48 wire
50 magnifier
52 magnifier lens
54 lens support frame
56 magnifier body
58 lens storage compartment

DETAILED DESCRIPTION OF THE INVENTION

According to the preferred embodiment of the invention as shown in FIGS. 1a, 3, 4, 6, and 7:

FIG. 1a shows an elevational view of add-on illumination device 10. A base 12 is attached to a battery holder 24. Battery holder 24 is attached to a central enclosure or housing 14. Housing 14 holds a switch 32. Housing 14 is attached to side extensions 16a and 16b. Side extensions 16a and 16b are attached to front extensions 18a and 18b respectively. Front extensions 18a and 18b are attached to lamp holders 20a and 20b respectively. Lamp holders 20a and 20b hold illumination sources 22a and 22b respectively. Illumination sources 22a and 22b are white Light Emitting Diodes (LEDs). The size of the LEDs is a common size of about three to five millimeters in diameter. Add-on illumination device 10 directs emitted light from illumination sources 22a and 22b toward the viewing area of a magnifier 50. Switch 32 is a push-button momentary type switch, which when pressed, energizes the circuit and lights illumination sources 22a and 22b. When switch 32 is not pressed, the circuit is not energized, so illumination sources 22a and 22b are not lit. Base 12, housing 14, side extensions 16a and 16b, front extensions 18a and 18b, lamp holders 20a and 20b, and battery holder 24 are a semi-rigid non-electrically conductive plastic such as acrylonitrile butadiene styrene (ABS), polycarbonate, or such semi-rigid plastic/plastic-alloy.

Figure 2:
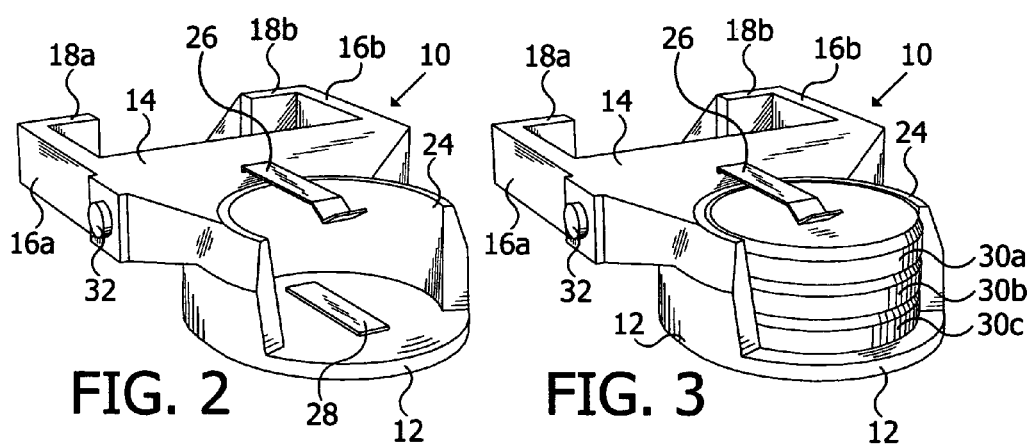
FIG. 2 is a rear view of the illumination device with the batteries removed.
Figure 3:
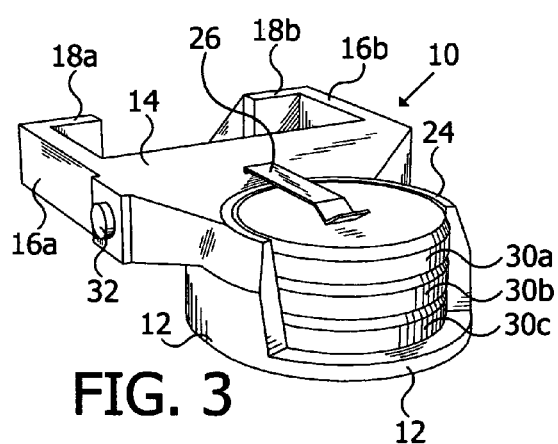
FIG. 3 is a rear view of the illumination device with the batteries installed.

FIGS. 2 and 3 best show how "coin-cell" type batteries 30a, 30b, and 30c are used in add-on illumination device 10. An upper battery contact 26 and a lower battery contact 28 make an electrical connection to batteries 30a and 30c respectively. Batteries 30a, 30b, and 30c are electrically connected in series by being stacked together in battery holder 24. The three batteries 30a, 30b, and 30c are preferably size CR2032.

Figure 4:
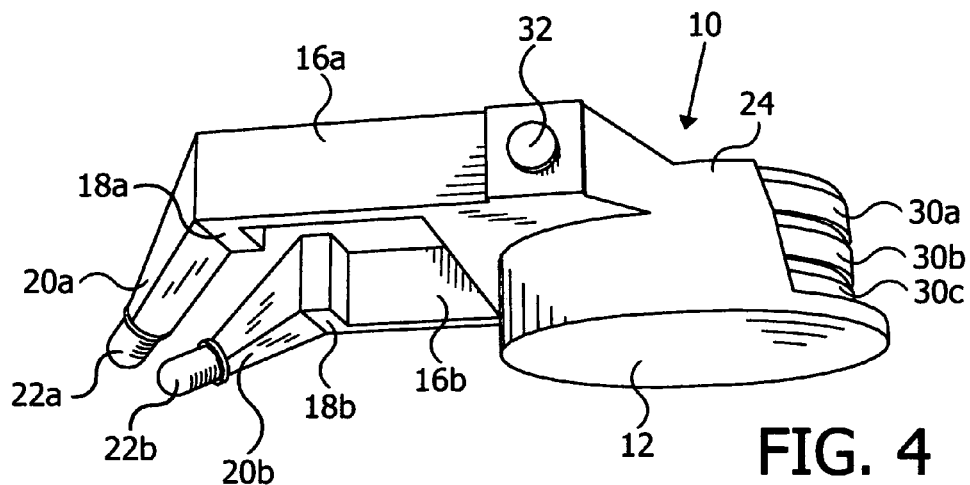
FIG. 4 is a view of the bottom side of the illumination device.
Figure 5:
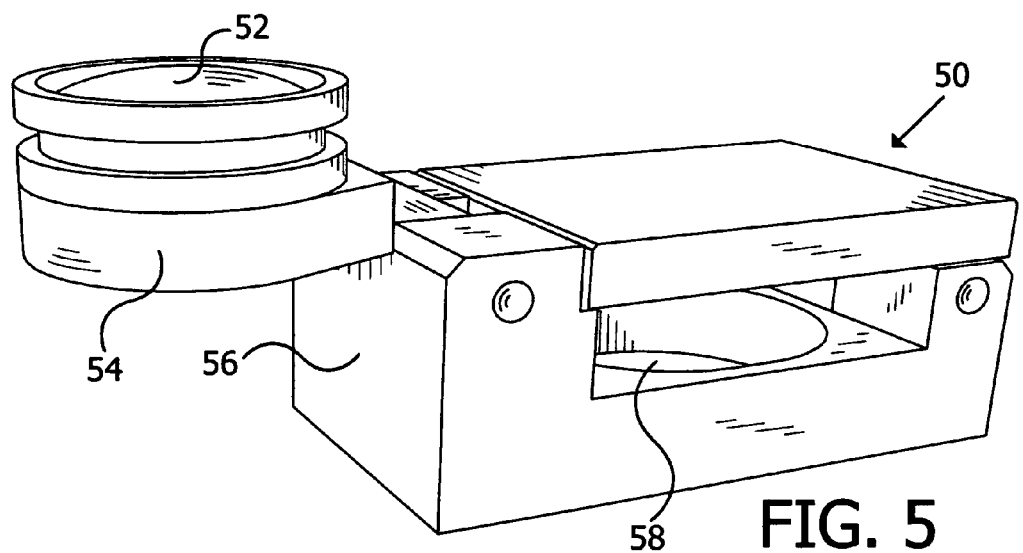
FIG. 5 shows a common collapsible magnifier with its lens and lens support frame in the opened position, that is, with the lens outside of the storage compartment and the lid closed. The collapsible magnifier is not part of the Add-on Illumination Device invention.

FIGS. 4 and 5 show how the bottom side of add-on illumination device 10, with base 12 and battery holder 24, is shaped and sized to fit into lens storage compartment 58.

FIG. 6 shows how add-on illumination device 10 is inserted into lens storage compartment 58 inside magnifier 50 while illumination sources 22a and 22b are slid past lens 52.

FIG. 7 shows magnifier 50 with add-on illumination device 10 installed. Lamp holders 20a and 20b are angled to direct light from illumination sources 22a and 22b toward the object being viewed under magnifier 50.

Figure 8:
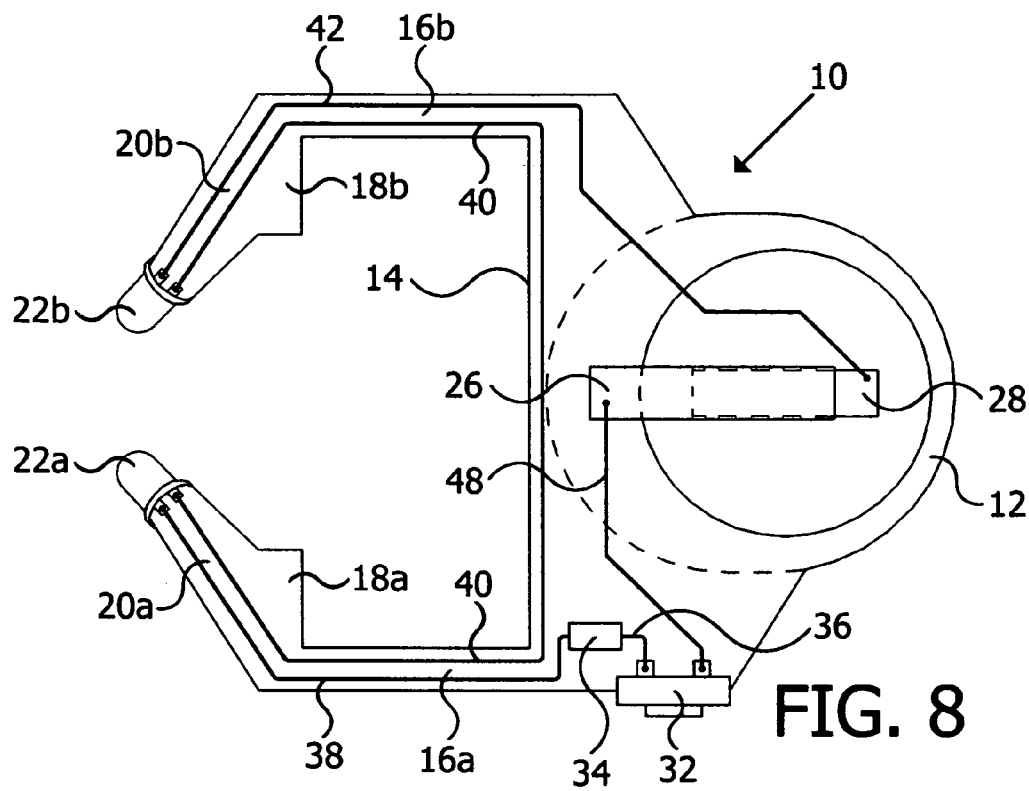
FIG. 8 is a cut-away view from the top of the illumination device showing the internal parts and wiring.
Figure 9:
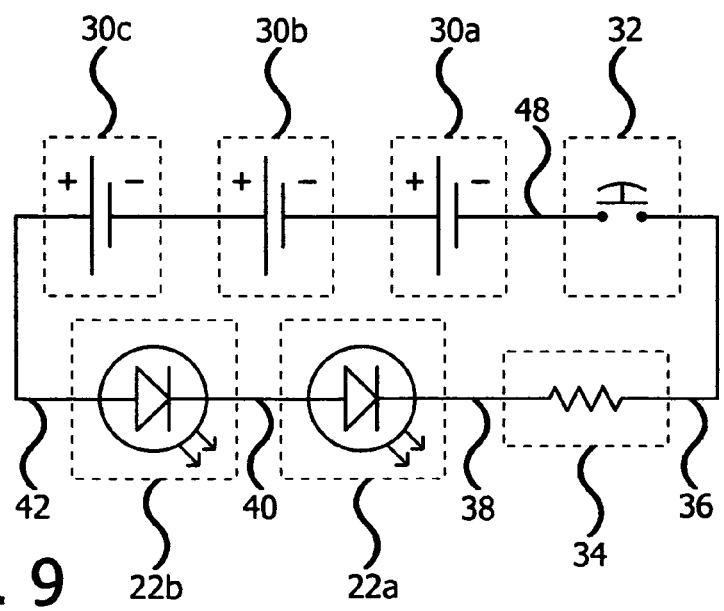
FIG. 9 is a schematic diagram of the electronic circuitry in the illumination device.

FIGS. 8 and 9 show the wiring of add-on illumination device 10. Batteries 30a, 30b, and 30c, each supplying about 3 volts are connected in series to provide about 9 volts to the electrical circuit. Batteries 30a, 30b, and 30c must all be oriented the same way so that they provide a sum of their respective voltages in the circuit. Batteries 30a, 30b, and 30c must also be oriented so that their positive side connects to the positive side of illumination sources 22a and 22b, and the negative side of batteries 30a, 30b, and 30c connects to the negative side of illumination sources 22a and 22b. The uppermost battery 30a is electrically connected to upper battery contact 26. Upper battery contact 26 is electrically connected to one terminal of switch 32 by means of a wire 48. The second terminal of switch 32 is electrically connected to one lead of a resistor 34 by means of a wire 36. Resistor 34 is used in the electrical circuit to limit the amperage of the circuit to within the tolerances of illumination sources 22a and 22b. Resistor 34 has a resistance value of about ninety ohms and a wattage rating of about one-eighth watt. The second lead of resistor 34 is electrically connected to one lead of illumination source 22a by means of a wire 38. The second lead of illumination source 22a is electrically connected to one lead of illumination source 22b by means of a wire 40. The second lead of illumination source 22b is electrically connected to lower battery contact 28 by means of a wire 42.

Figure 1B:
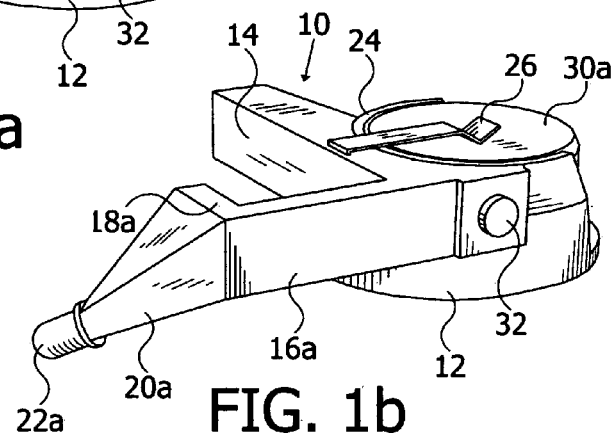
FIG. 1b is a perspective view of an alternative embodiment of the illumination device.

Alternative Embodiment:

FIG. 1b shows an elevational view of an alternative embodiment of add-on illumination device 10. A single illumination source 22a is used instead of two. As FIG. 1b shows, side extension 16b, front extension 18b, and lamp holder 20b are omitted. Resistor 34 (shown in FIGS. 8 and 9) has a resistance value of about two hundred and seventy ohms. Since one illumination source 22b is omitted, wires 40 and 42 are electrically connected as a single wire. This embodiment with only one illumination source 22a can be made with two batteries 30a and 30b instead of three batteries 30a, 30b, and 30c. With two batteries 30a and 30b, the resistor 34 has a resistance value of about one hundred and twenty ohms.

Additional Embodiments:

Illumination sources 22a and 22b: Colored LEDs, miniature incandescent light bulbs, or other types of illumination sources may be used instead of white LEDs. Switch 32 can be a push-on/push-off type switch or a slide type switch. Either type would enable hands-free use of add-on illumination device 10. Batteries 30a, 30b, and 30c can be a size other than CR2032 as long as space allows, and they are able to supply a sufficient amount of electrical energy to illumination sources 22a and 22b. The number of batteries 30a, 30b, and 30c may be more or less in quantity than the preferred embodiment depending on the voltage supplied by the batteries 30a, 30b, and 30c, the voltage requirements of illumination sources 22a and 22b, and the number of illumination sources used.

Operation of the Invention:

After a simple one-step installation as shown in FIGS. 6 and 7, the add-on illumination device 10 is ready for use at any time. Magnifier 50 is placed over the object or image to be viewed. The user pushes switch 32 with a finger or thumb to energize add-on illumination device 10, creating a flood of bright light on the object or image under the lens 52 of magnifier 50.

Conclusion, Ramifications, and Scope of Invention:

Thus the reader will see that the add-on illumination device is extremely easy to install and use, and it provides an excellent source of illumination to a magnified image or object. Although the present invention has been described in considerable detail with reference to the various embodiments, other embodiments are possible. Therefore, the scope of the invention should be determined not by the description of the embodiments illustrated but by the appended claims and their legal equivalents.

I claim:

1. An add-on illumination device for illuminating a previously existing collapsible magnifier's field of view, comprising:
   a. a housing formed of a durable moldable non-conductive material,
   b. at least one source of illumination,
   c. a base positioned below said housing and attached to said housing,
   d. at least one battery for providing electrical power to said source of illumination,
   e. at least one elongated extension attached to said housing, said elongated extension projecting horizontally along a side of said collapsible magnifier and in close proximity to said collapsible magnifier,
   f. at least one lamp-holding arm connected to said at least one source of illumination and attached to end of said elongated extension, said lamp-holding arm being angled with respect to said elongated extension so that said lamp-holding arm is pointed substantially in the direction of said collapsible magnifier's field of view,
   g. an electrical switch for on/off control of said source of illumination,
   h. said base providing a structural means for support to said battery,
   i. said base providing a structural means for support to said housing,
   j. said housing providing a structural means for support to said electrical switch and said elongated extension,
   k. said base and said housing being shaped to fit inside of said collapsible magnifier with sufficient clearance between said add-on illumination device and said collapsible magnifier to allow said add-on illumination device to be inserted into and removed from said collapsible magnifier, l. said housing containing electrical wiring for providing electrical power to said add-on illumination device, m. whereby a substantial means for illuminating said previously existing collapsible magnifier's field of view will be provided.

2. The illumination device of claim 1 wherein said illumination source is at least one white light emitting diode.

3. The illumination device of claim 1 wherein said battery is at least one coin-cell type.

4. The illumination device of claim 1 wherein said electrical switch is a momentary type electrical switch.

5. The illumination device of claim 1 wherein said electrical switch is a slide-type electrical switch.

6. The illumination device of claim 1 wherein said electrical switch is a push-on push-off type electrical switch.

* * * * *